(12) United States Patent
Lombard et al.

(10) Patent No.: US 7,458,764 B2
(45) Date of Patent: Dec. 2, 2008

(54) NOZZLE DEVICE FOR A TURBOCHARGER AND ASSOCIATED CONTROL METHOD

(75) Inventors: Alain Lombard, Uxgeney (FR); Marylene Ruffinoni, Les Forges (FR); Olivier Espasa, Dogenville (FR)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/545,930

(22) PCT Filed: Feb. 19, 2003

(86) PCT No.: PCT/IB03/00574

§ 371 (c)(1),
(2), (4) Date: May 5, 2006

(87) PCT Pub. No.: WO2004/074643

PCT Pub. Date: Sep. 2, 2004

(65) Prior Publication Data

US 2006/0233640 A1 Oct. 19, 2006

(51) Int. Cl.
*F01D 17/16* (2006.01)

(52) U.S. Cl. .......................... 415/1; 415/158; 415/165; 415/166; 60/602

(58) Field of Classification Search ..................... 415/1, 415/157, 158, 165, 166; 60/602
See application file for complete search history.

(56) References Cited

U.S. PATENT DOCUMENTS

| | | | | |
|---|---|---|---|---|
| 3,749,513 | A | * | 7/1973 | Chute .......................... 415/158 |
| 4,292,807 | A | * | 10/1981 | Rannenberg ................. 415/158 |
| 5,452,986 | A | * | 9/1995 | Osborne et al. ............. 415/165 |
| 5,454,225 | A | * | 10/1995 | Sumser et al. .............. 415/166 |
| 7,024,855 | B2 | * | 4/2006 | Perrin et al. ................... 60/602 |
| 7,097,432 | B1 | * | 8/2006 | Lombard et al. ............ 415/158 |

FOREIGN PATENT DOCUMENTS

| | | | | |
|---|---|---|---|---|
| EP | 1128025 | A2 | * | 8/2001 |
| SU | 1507990 | A | * | 9/1989 ................. 415/166 |

* cited by examiner

*Primary Examiner*—Christopher Verdier
(74) *Attorney, Agent, or Firm*—Chris James (57) ABSTRACT

A variable nozzle device for a turbocharger comprises an annular arrangement of vanes disposed in a nozzle formed between an inner wall and an outer wall, the outer wall being constituted by an axially displaceable member, wherein the axially displaceable member is displaceable by an action exerted from the side of the inner wall.

32 Claims, 11 Drawing Sheets

NOZZLE DEVICE FOR A TURBOCHARGER AND ASSOCIATED CONTROL METHOD

The present invention relates to a variable nozzle device and in particular to a variable nozzle device for a turbocharger. Also, the invention relates to a method for controlling a variable nozzle device, in particular of a turbocharger.

In a conventional turbocharger apparatus for use in association with internal combustion engines a variable nozzle vane assembly is known from the state of the art. The conventional turbocharger apparatus comprises an exhaust gas driven turbine and an inlet air compressor. The inlet air compressor is driven by power generated by the exhaust gas driven turbine wherein a turbine wheel of the exhaust gas driven turbine is mounted on a common shaft with a compressor impeller of the inlet air compressor.

The conventional turbocharger apparatus is provided with a housing having an exhaust gas inlet for supplying the exhaust gas to the exhaust gas turbine. In a passage for supplying the exhaust gas to the exhaust gas turbine, vanes are provided to force the flow of the exhaust gas into a predetermined direction.

According to the state of the art, the vanes are variable, e.g. by the provision of pivotable vanes such that a geometric arrangement of the flow passage is adjustable according to the conditions of the flow of the exhaust gas.

It is the object of the present invention to provide a variable nozzle device for a turbocharger with an improved configuration and an enhanced efficiency and to provide a control method for a variable nozzle device, in particular for a turbocharger.

Further developments of the invention are set forth in the dependent claims.

According to an aspect of the invention, a variable nozzle device for a turbocharger comprises an annular arrangement of vanes between an inner wall and an outer wall, wherein said outer wall is constituted by an axially displaceable member. Furthermore, said axially displaceable member is displaceable by an action exerted from the side of the inner wall. This means that the movement of said displaceable member, for example such as a hollow piston member, can be effected from the side of the inner housing which accommodates actuating elements of the turbocharger.

With this arrangement, the entire structure can be simplified and the reliability thereof can be improved, since the actuating from the side of the inner housing can be assembled more easily and a further actuating mechanism at the side of the outer housing of the turbocharger can be omitted.

Furthermore, by means of a structure according to the invention, further options of actuating the axially displaceable member are enabled.

Preferably, said action is exerted by an engagement of said axially displaceable member with an actuating member on the side of said inner wall. The engagement of said inner side wall effects the displacement of the axially displaceable member such that any movement of said movable member on the side of the inner wall can be applied as long as an engagement is provided. It is preferable that said axially displaceable member is displaceable by a movement of said movable member on said inner wall along an inclined portion of said axially displaceable member. Between said inner wall and said outer wall an annular inflow passageway for supplying an exhaust gas to an exhaust gas turbine is formed. The cross-sectional area of said inflow passageway is increased by displacing said axially displaceable member away from said inner wall. Preferably, said annular arrangement of vanes is provided on said inner wall.

By means of this arrangement, the cross-sectional area of the passageway can be adjusted corresponding to e.g. the operational condition of the engine. The inclined portion can be adjusted or tuned so as to provide the nozzle device with a predetermined behavior.

Preferably, said vanes each comprise at least two portions which are movable relative to each other. Preferably, said vanes are directed in a direction so as to direct the flow of the fluid substantially in a tangential direction with respect to the annular arrangement. Thereby it is possible to change not only the effective size of the vane but also the geometrical relations of the entire nozzle device.

It is preferable that said two portions which are movable relative to each other comprise at least one fixed vane member and one movable vane member. Furthermore, said movable vane member is movable relative to said fixed vane member in the radial direction so as to change the radial length of said vane. Thereby, the nozzle opening amount or degree can be adjusted with respect to the cross-sectional area of an inflow passageway and also the geometry is adjustable. Preferably, the movable vane member constitutes said actuating member.

Preferably, said fixed vane member and said movable vane member protrude from a fixed vane plate and a movable vane plate. Furthermore, said movable vane plate is movable, preferably rotatable, with respect to the fixed vane plate, and said movable member on said inner wall side is at least one of said movable vane members. This structure provides a simple and reliable system due to a low number of moving components.

It is preferably that said axially displaceable member is displaced by said movement of said movable vane member when said movable vane member is in a predetermined position range. Also preferably, by moving said movable vane member said annular inflow passageway is gradually opened or closed. Furthermore, said axially displaceable member is moved to open said annular inflow passageway as said movable vane member is moved to open said annular inflow passageway.

By means of this arrangement, both the displacement of said axially displaceable member and the actuation of said vanes is enabled by a single actuation mechanism. By a predetermined design of the engagement portion, the relation of the adjustment of the axially displaceable member and the adjustment of the vanes can be freely selected.

According to a further aspect of the invention, a variable nozzle device for a turbocharger is provided, which comprises an annular arrangement of vanes, wherein each vane comprises at least two portions movable relatively to each other in a circumferential direction. Preferably, one of said at least two portions forms an adjustable extension of said vane in the circumferential direction of said annular arrangement. Also preferably, said two portions comprise a fixed vane member and a movable vane member.

With this structure, a simple nozzle device is provided which comprises a low number of moving components thereby increasing the reliability. It is preferable that said fixed vane member and said movable vane member protrude from a fixed vane plate and a movable vane plate, respectively, and form a nozzle ring. Said movable vane plate is preferably rotatable relative to said fixed vane plate. Only two movable members enable the adjusting of the vane assembly by rotating one vane plate relative to the other. Thereby, the structure can be made simple and reliable.

Preferably, by rotating said movable vane plate relative to said fixed vane plate, a circumferential length of said vane is adjustable. Also, by rotating said movable vane plate relative to said fixed vane plate, an opening amount of said nozzle device is gradually adjustable.

According to the invention, said movable vane plate is rotatable by an actuator mechanism. Preferably, the movement of said vane members is restricted by a restriction means. Also, said movable vane member is urged towards a closing direction of said nozzle device relative to said fixed vane member by a spring member. The restricting means and/or the spring member enhances the function and reliability of the nozzle device. Further, a closed position is ensured in the case of failure of the actuating system, and the maximum opening amount can be set in accordance with mechanical and/or structural values.

According to a further aspect of the invention, a method for controlling a variable nozzle device of a turbocharger is provided which comprises a plurality of vanes arranged in a nozzle defined between an inner wall and an outer wall, said vanes forming nozzle passages, said method comprising the steps of:

adjusting the nozzle passages by adjusting said vanes, and adjusting the nozzle by varying the interval between said inner wall and said outer wall, wherein the adjusting of said nozzle is achieved in response to said adjusting of the nozzle passages and vice versa.

Preferably, said interval between said inner wall and said outer wall is gradually increased as said nozzle passages open. Also preferably, said interval between said inner wall and said outer wall is varied by said adjusting of said nozzle passages when said nozzle passages are in a predetermined opening range.

The adjusting of said nozzle is preferably achieved by a single actuating mechanism.

In the method, said axially displaceable member forming said outer wall is gradually moved axially towards an opening direction as said movable vane member is moved towards a direction of opening said annular inflow passageway.

By means of the method according to the invention, the degrees of freedom of the axially displaceable member and of the vanes can be used to adjust the cross-sectional inflow area of the annular passageway. Also, the cooperation of the axially displaceable member with the vanes can sufficiently be set. Therefore, it is possible to design the arrangement such that the opening amount of the vane assembly relative to the opening amount of said axially displaceable member is set to an optimum relation depending on the requirements of the entire system.

It is to be noted that the features set forth above and as defined in the claims can be freely combined. That is, the invention can be embodied only having the axially displaceable member or only the adjustable vanes. In the case that both the axially displaceable member and the adjustable vanes are applied, it is possible that they are operated independently or by cooperating with each other.

Preferred embodiments of the invention are explained by way of examples with reference to the accompanying drawings.

An embodiment of the present invention is explained with reference to the Figures.

First, a turbocharger apparatus according to an embodiment of the present invention is explained with reference to FIG. 7 and FIG. 8A. According to FIG. 7, the turbocharger apparatus is provided with a housing which comprises an exhaust gas turbine housing 1 and an inlet air compressor housing 2.

Figure 8A:
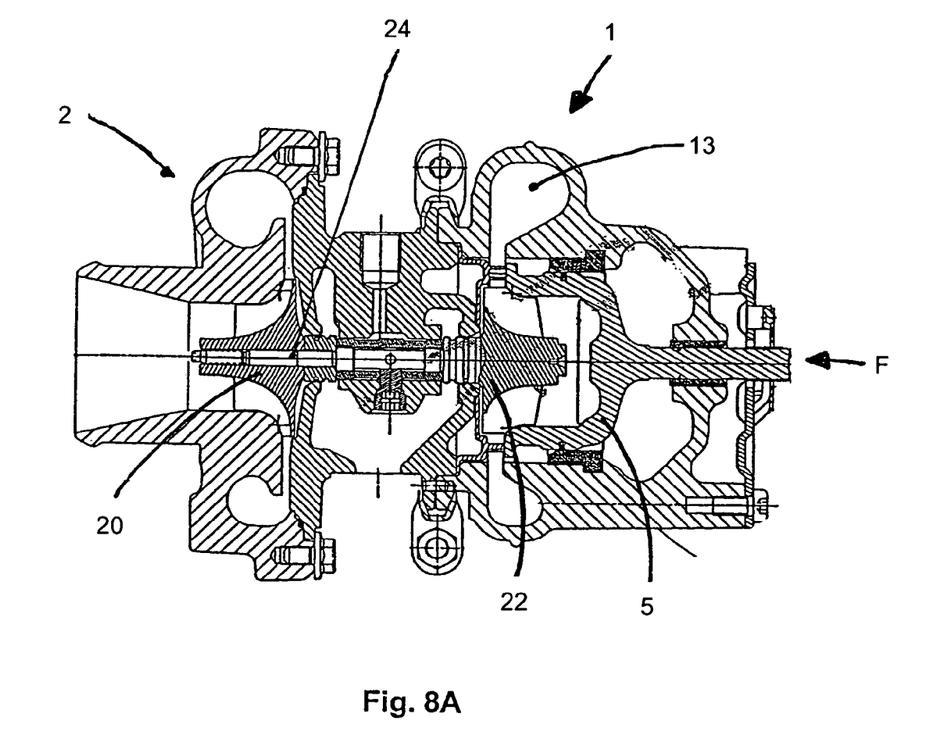
FIG. 8A shows the turbocharger apparatus according to an embodiment of the present invention in a cross-sectional view in a closed position.

According to FIG. 8A, in the inlet air compressor housing 2, an inlet air compressor is accommodated which comprises an inlet air compressor impeller 20. The inlet air compressor impeller 20 is mounted on a shaft 24 which is rotatably supported in the housing.

In the exhaust gas turbine housing 1, an exhaust gas turbine is accommodated, which comprises an exhaust gas turbine wheel 22 which is mounted on the same shaft 24 as the inlet air compressor impeller 20. The exhaust gas turbine housing 2 is arranged so as to surround the exhaust gas turbine wheel 22. In particular, a flow passage 13 which forms a volute is formed around the wheel 22. On a tangential portion of the housing, an exhaust gas inlet 17 is provided, as shown in FIG. 7.

Figure 7:
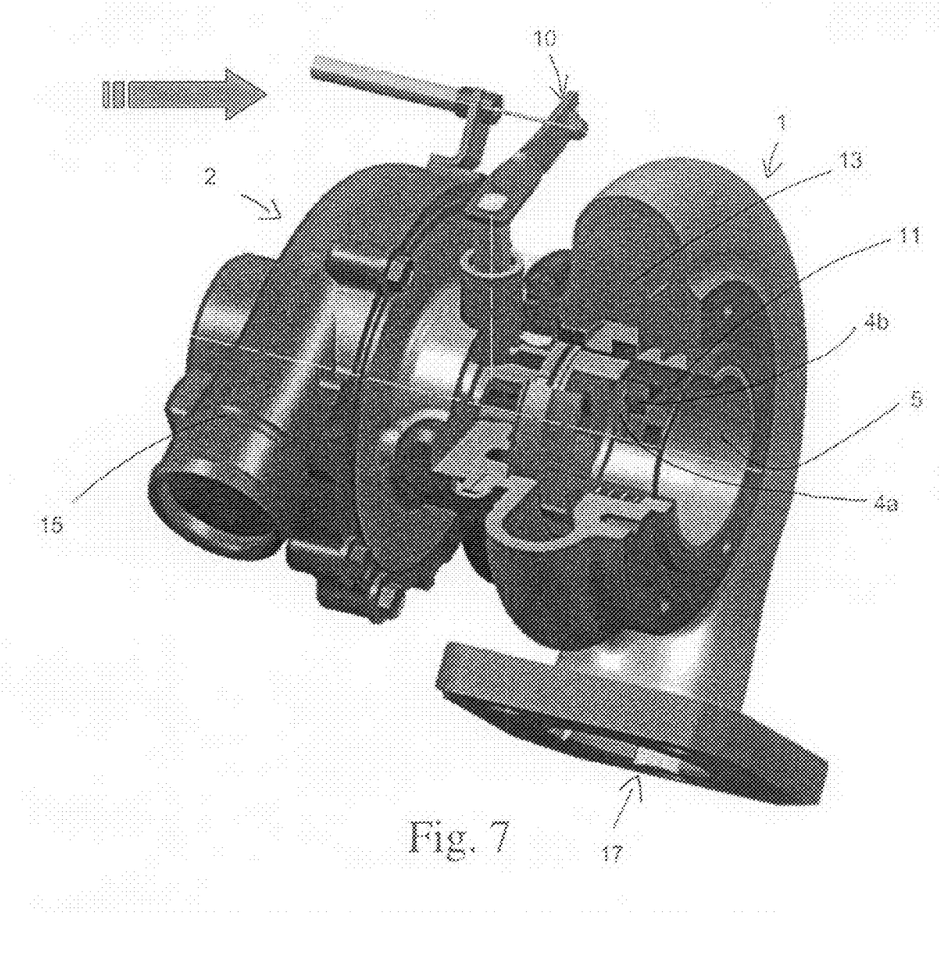
FIG. 7 shows a turbocharger apparatus according to an embodiment of the present invention having the variable nozzle device in a partially cut-away view wherein the turbine wheel is omitted.

As shown in FIG. 7 and 8A, in the exhaust gas turbine housing 1, a variable vane means and a sliding piston device (axially displaceable member) 5 are provided so as to substantially surround the exhaust gas turbine wheel 22. The sliding piston device 5 forms the exhaust gas outlet of the turbocharger apparatus. The sliding piston device consists of a tubular member which is slidably supported in an outlet portion of the exhaust gas turbine housing 1 so as to be movable in the axial direction of the shaft. According to the embodiment, the sliding piston member forms an outer wall of the exhaust gas inlet.

Figure 1:
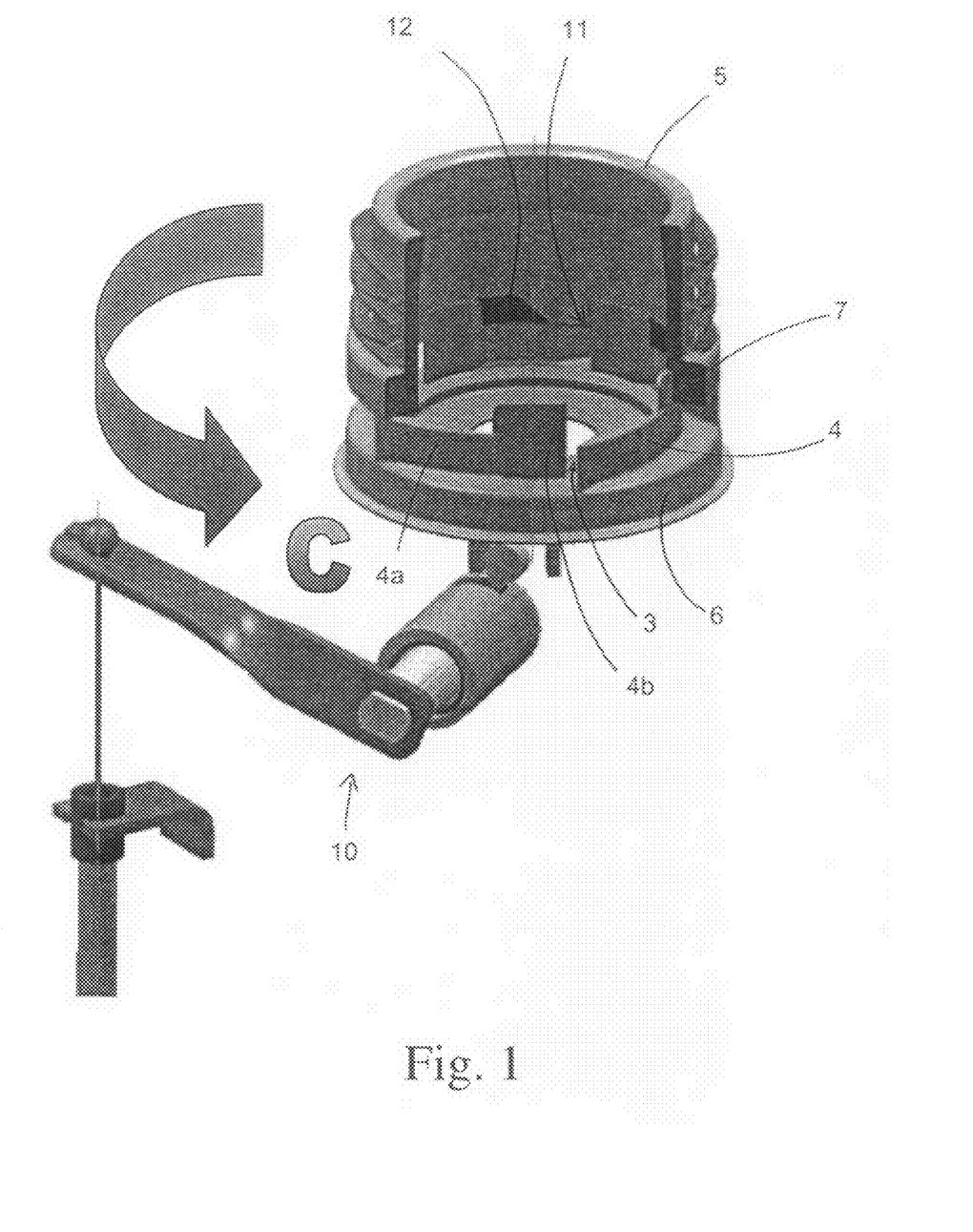
FIG. 1 shows an embodiment of the variable nozzle device according to the invention in a closed position.

The variable vane means 4a, 4b, 6, 7 and the sliding piston device 5 are further explained with reference to the Figures. FIG. 1 is a detailed illustration of the variable vane means and the sliding piston device according to the present embodiment of the invention.

The variable vane means comprises a nozzle ring surrounding the exhaust gas turbine wheel 22. The nozzle ring according to the embodiment forms a dividable device which constitutes an inner wall of the exhaust gas turbine. The variable vane means includes said nozzle ring having vanes 4a, 4b and vane support plates 6, 7.

The variable vane means comprises a fixed vane support plate 6 and a movable vane support plate 7. The fixed vane support plate 6 is substantially circular in shape and is provided with an opening in a center portion thereof. In said opening of the fixed vane support 6 plate, the movable vane support plate 7 is inserted. The outer diameter of the movable vane support plate 7 is set so as to enable a sliding rotation thereof with respect to the fixed vane support plate 6. According to the embodiment, the fixed support plate 6 and/or the movable support plate forms the inner wall of the exhaust gas inlet. However, it is also possible that the fixed vane support is formed as an inner plate wherein the movable vane support is formed radially outward of the fixed vane support. Also, both vane supports can be formed rotatably relative to each other.

Figures 8B, 8C:
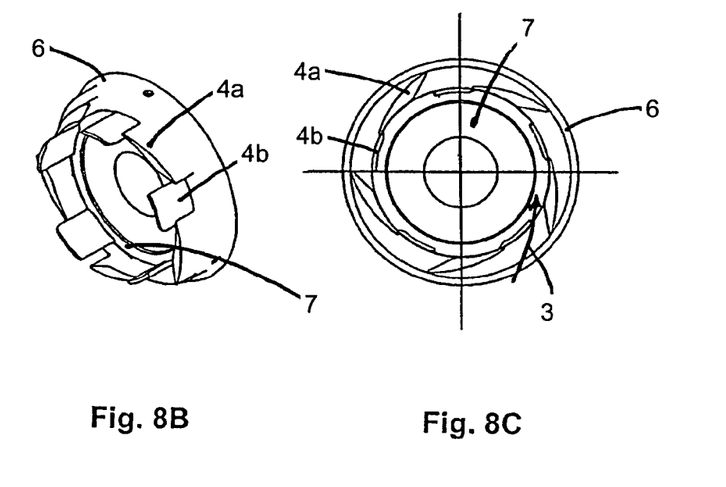
FIG. 8B and FIG. 8C show the nozzle ring used in the turbocharger apparatus of FIG. 8A in the fully closed position.

As shown in FIGS. 8A and 8B, a plurality of fixed vanes 4a is arranged on one surface of the fixed vane support plate 6 so as to protrude therefrom. The vanes are substantially fan-shaped and slightly oblique with respect to the tangent of the fixed vane support plate 6.

A plurality of movable vanes 4b is arranged on one surface of the movable vane support plate 7 so as to protrude therefrom in the same direction as the fixed vanes 4a. The movable vanes 4b are arranged inward with respect to the fixed vanes 4a, and the number of fixed vanes 4a corresponds to the number of the movable vanes 4b. The number of fixed vanes 4a and the number of the movable vanes 4b are five in the present embodiment but not limited to said number. The movable vanes 4b and the fixed vanes 4a form two portions of a vane which are movable relative to each other.

By rotating the movable vane support plate 7 relative to the fixed vane support plate 6, the movable vanes 4b are moved relative to the fixed vanes 4a. Therefore, the movable vanes 4b are arranged in the projection of the fixed vanes 4a or form an extension of the fixed vanes 4a in their direction of length in the tangential direction.

Figure 4A:
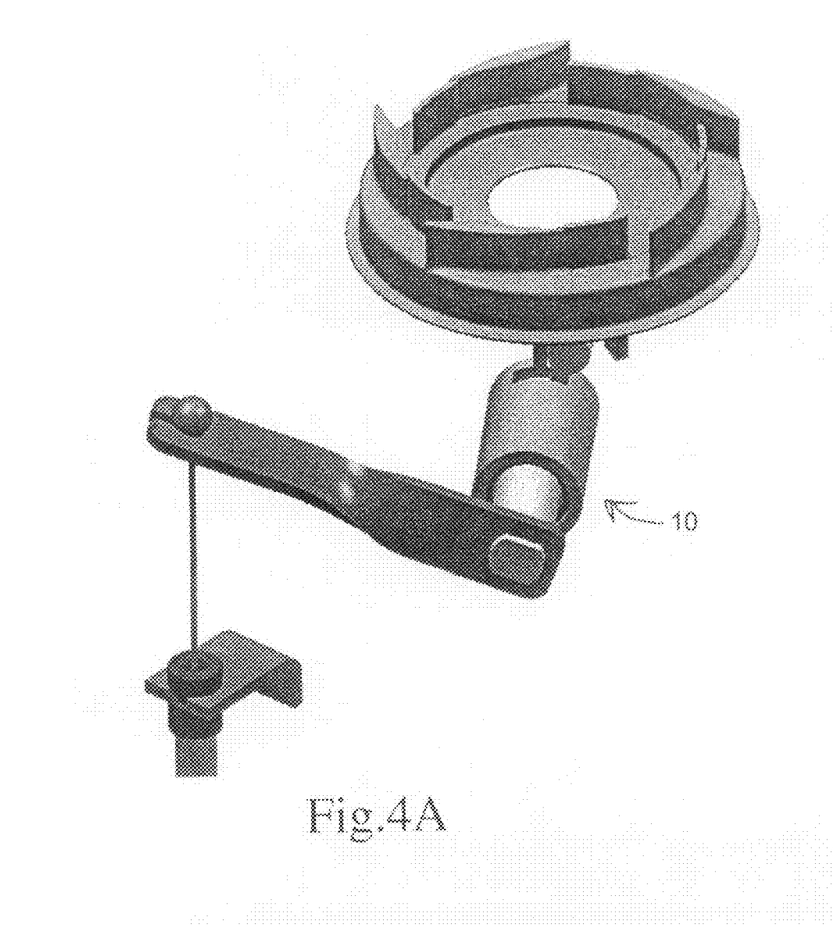
FIG. 4A shows a portion of the variable nozzle device with an actuator according to an embodiment of the invention in a closed position.
Figure 4B:
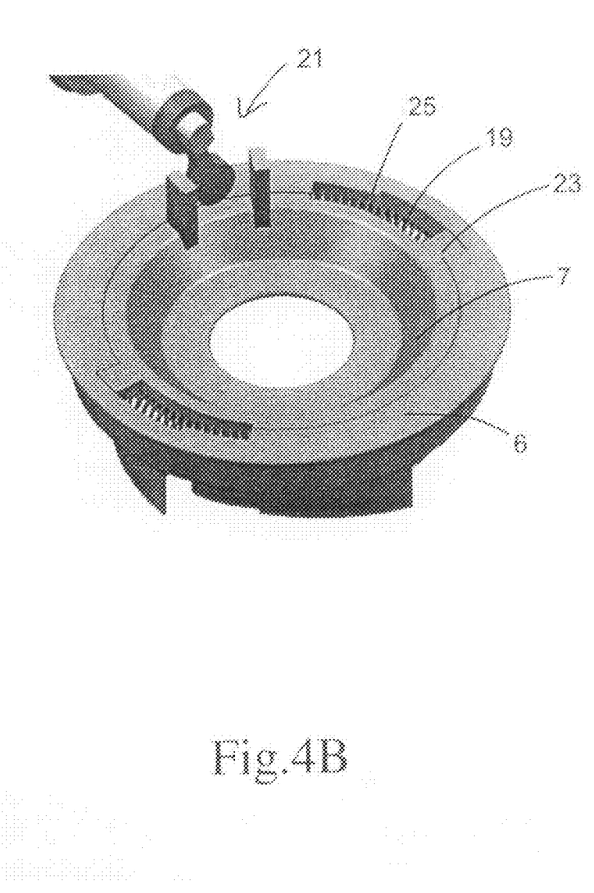
FIG. 4B is a bottom view of FIG. 4A

The function of the variable vane means according to the present embodiment is described with reference to the Figures. In FIG. 4A and FIG. 4B, the variable vane means is shown in a closed position. That is, the movable vane support plate 7 is positioned with respect to the fixed vane support plate 6 such that the movable vanes 4b extend from one end of the fixed vanes 4a in the circumferential direction of the vane support plates. In FIG. 8A and FIG. 8B, the nozzle ring is shown in a more detailed view in a closed position.

A spring member 19 is provided between the movable vane support plate 7 and the fixed vane support plate 6 so as to urge the movable vane support plate 7 towards an end position of the rotation of the movable vane support plate 7 with respect to the fixed vane support plate 6. Preferably, said end position of the movable vane support plate 7 effects the closed position of the variable vane means, as shown in FIG. 4B. However, as the end position of the movable vane support plate 7, each position such as the open position of the vane assembly can be set according to the system requirements.

Figure 2:
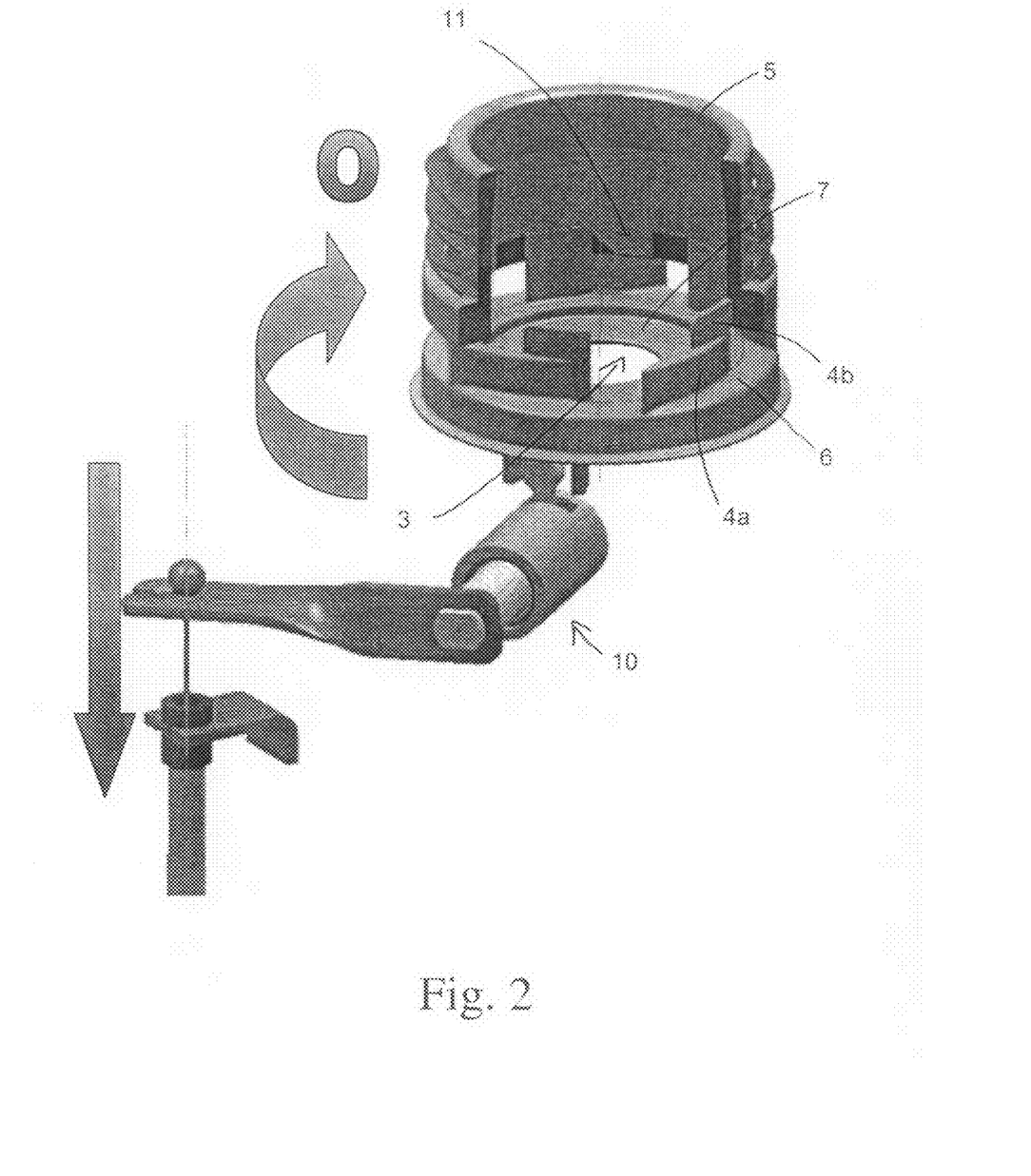
FIG. 2 shows the variable nozzle device of FIG. 1 in a mid-open position.
Figure 3:
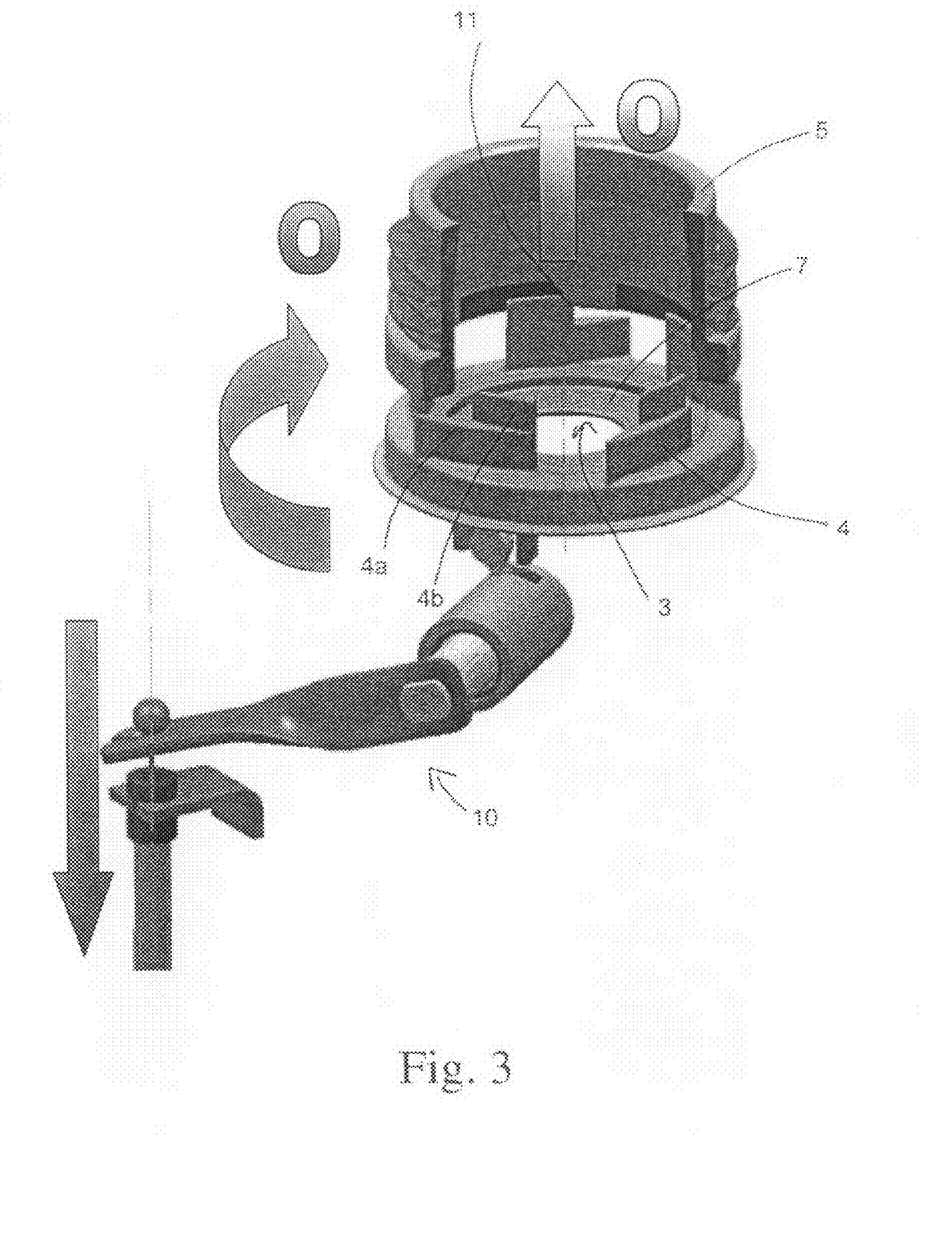
FIG. 3 shows the variable nozzle device of FIG. 1 in a fully open position.

On the side opposite to the side where the vanes are provided, an engagement device 21 is provided on the movable vane support plate 7, as shown in FIGS. 1-3. The engagement device 21 is capable of engaging with a portion of an actuating mechanism 10. By operating the actuating mechanism 10, the movable vane support plate 7 is rotated relative to the fixed vane support plate 6 against the force of the spring member 19. Thereby, the movable vanes 4b are moved in the rotational direction such that their side surfaces facing outward in the radial direction are moved to gradually increase the area which is covered by side surfaces of the fixed vanes 4a which face in an inward direction in the radial direction.

Figure 5:
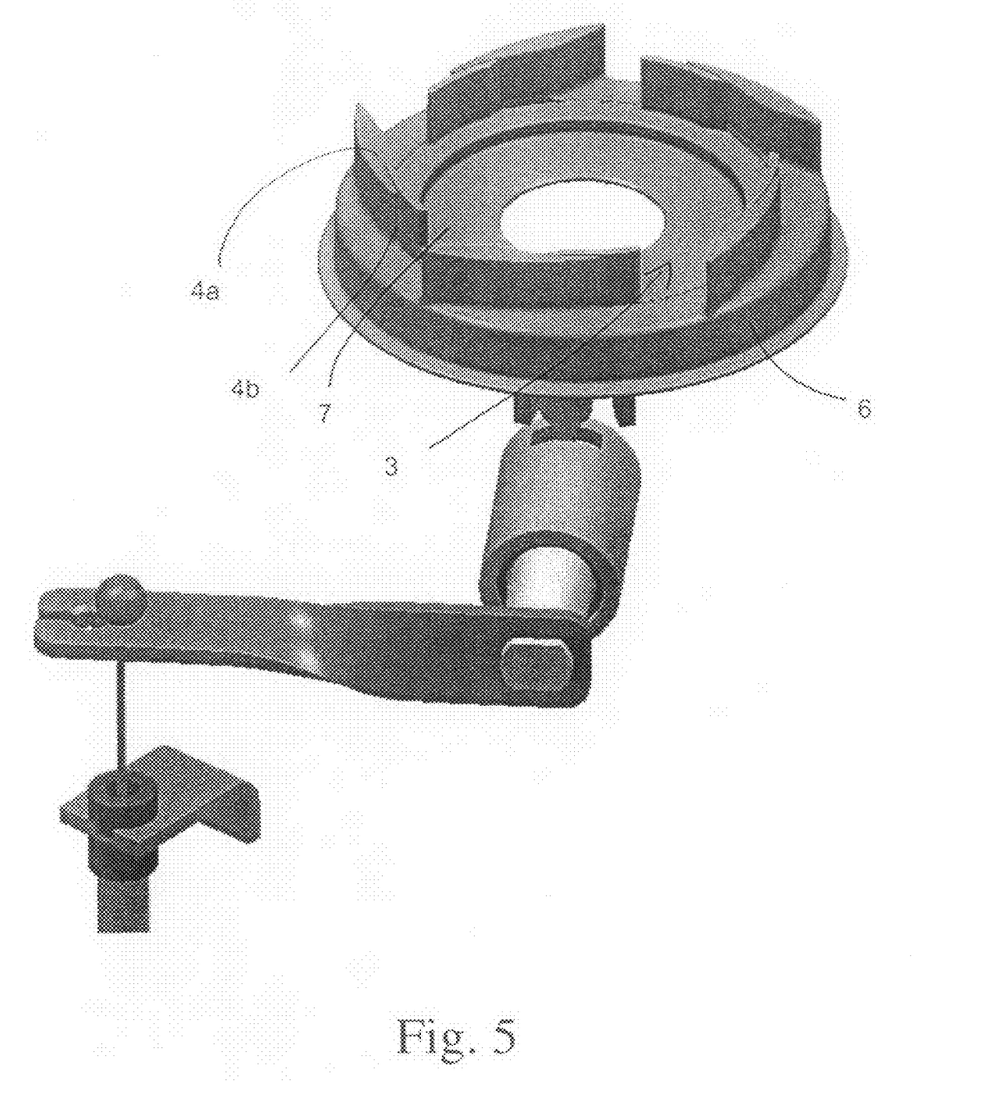
FIG. 5 shows a portion of the variable nozzle device of FIG. 4A in a mid-open position.
Figure 9A:
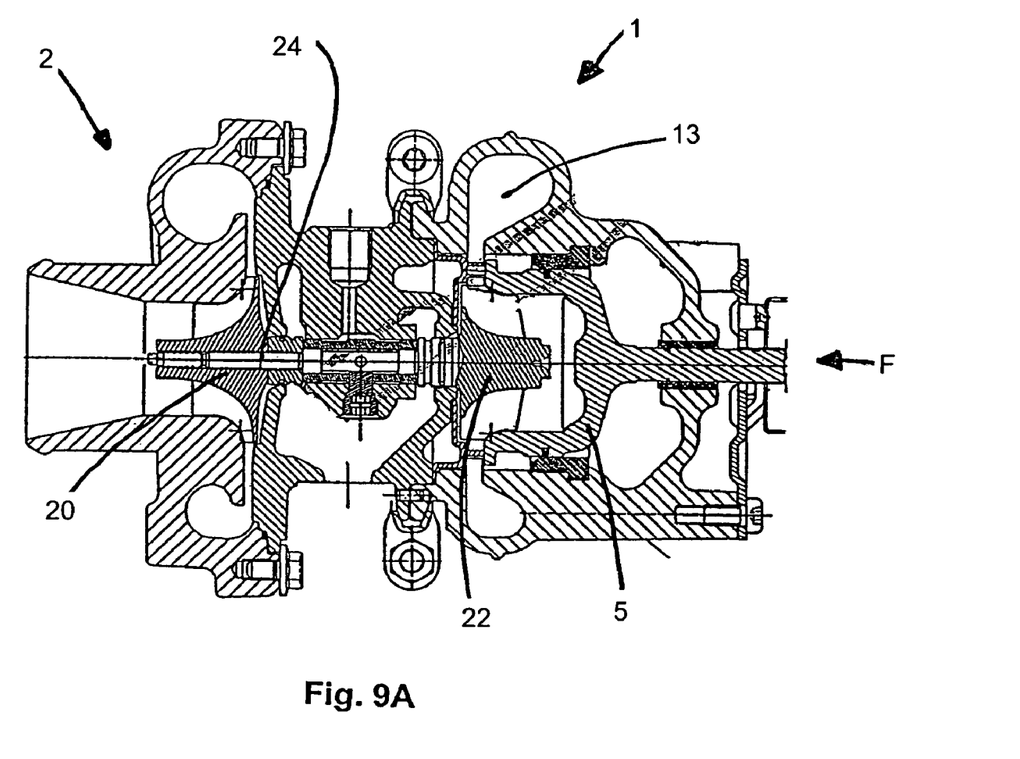
FIG. 9A shows the turbocharger apparatus according to an embodiment of the present invention in a cross-sectional view in a mid open position.
Figures 9B, 9C:
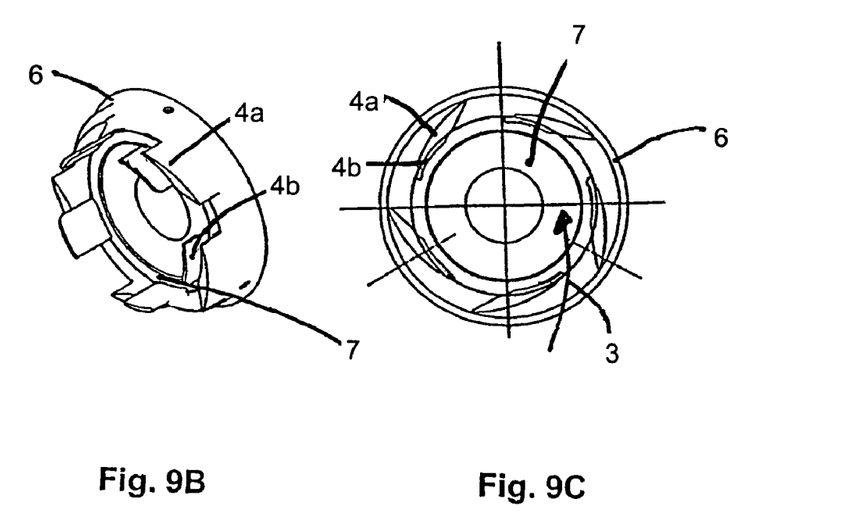
FIG. 9B and FIG. 9C show the nozzle ring used in the turbocharger apparatus of FIG. 9A in the mid open position.

By operating the actuating mechanism against the spring member 19, the variable vane means is gradually opened and a mid-open position thereof is provided as shown in FIG. 5. That is, the space for supplying the exhaust gas to the turbine between each of the vanes is increased. FIG. 9A shows the turbocharger apparatus according to the embodiment in the mid-open position of the variable vane means. As shown in FIG. 9B and FIG. 9C, the nozzle ring is in a fully open position, while the sliding piston member is held in the closed position.

The sliding piston device 5 is pressed toward the nozzle ring by a force F, as shown e.g. in FIG. 9A, to maintain a sufficient pressure against the nozzle ring to provide an appropriate engagement between the sliding piston device 5 and the nozzle ring.

Figure 6A:
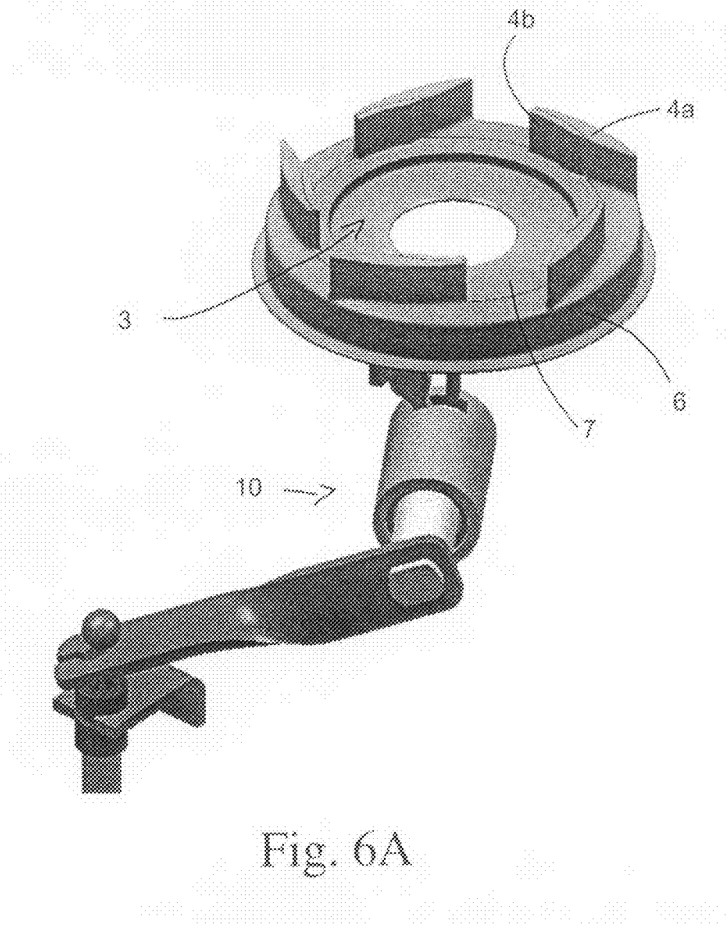
FIG. 6A shows a portion of the variable nozzle device of FIG. 4A in a fully open position.
Figure 6B:
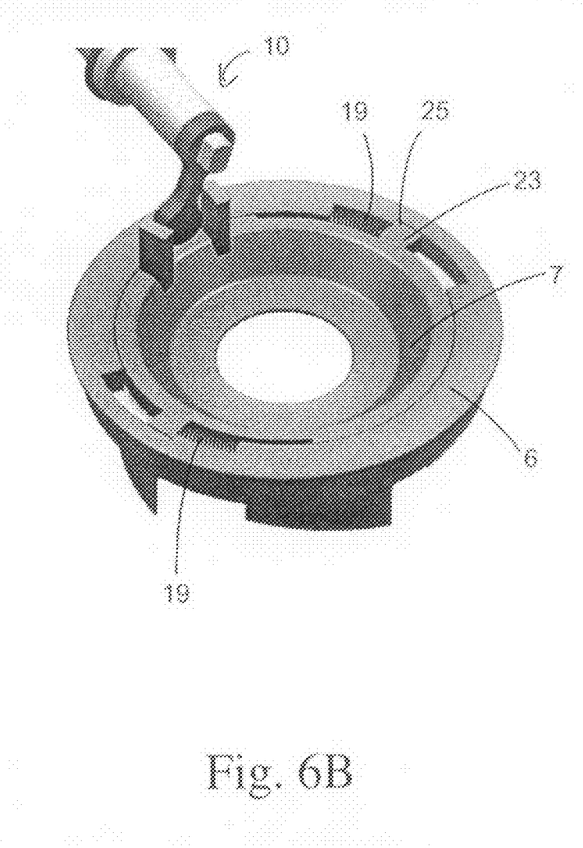
FIG. 6B is a bottom view of FIG. 6A.
Figure 10A:
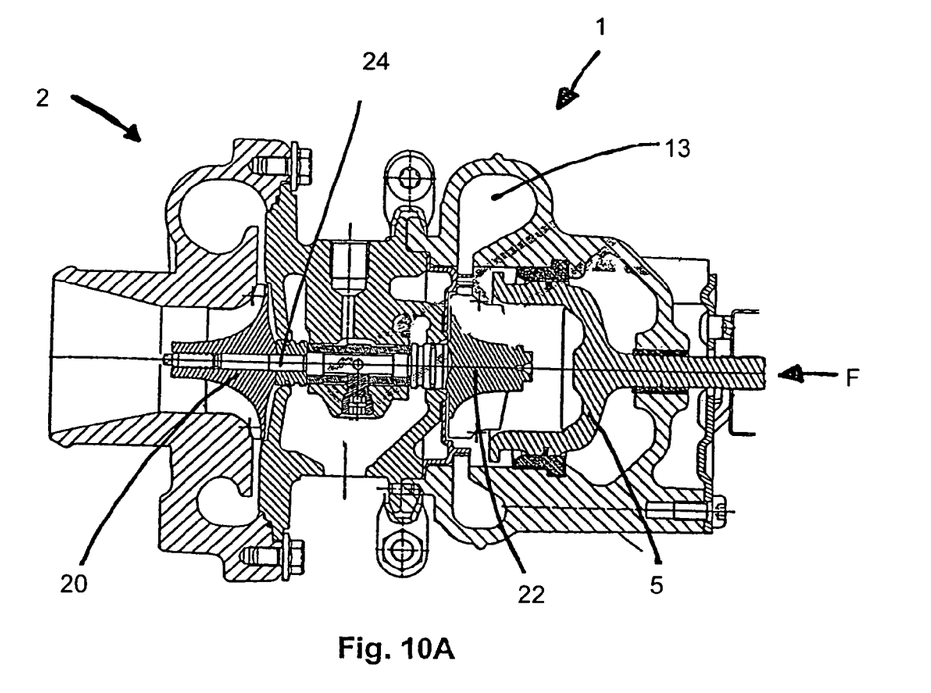
FIG. 10A shows the turbocharger apparatus according to an embodiment of the present invention in a cross-sectional view in a fully open position.
Figure 10B:
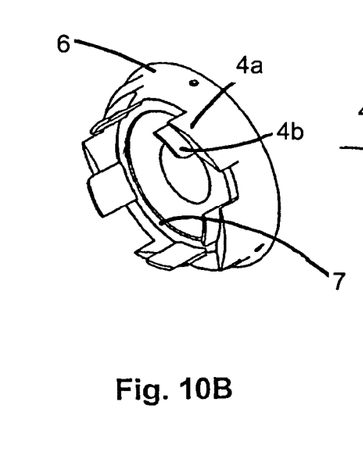
FIG. 10B and FIG. 10C show the nozzle ring used in the turbocharger apparatus of FIG. 10A in the closed position.
Figure 10C:
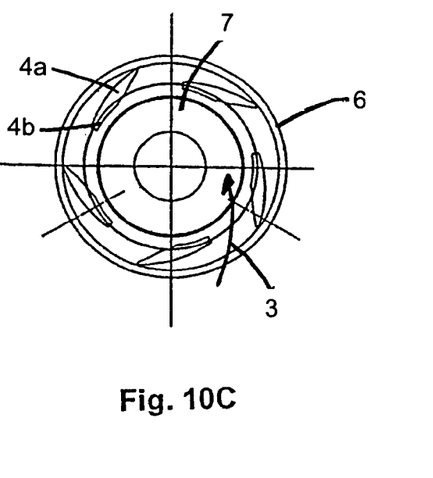

By further operating the actuating mechanism 10 against the force of the spring member 19, the movable vane support plate 7 is further moved in the rotational direction with respect to the fixed vane support plate 6. Thereby, a fully open condition of the variable vane means is achieved as shown in FIG. 6A and FIG. 6B. In FIG. 6B, a protrusion 23 abuts against the step 25 so as to limit the rotational movement of the movable vane support plate 7. FIG. 10A shows a more detailed view of the turbocharger apparatus according to the embodiment in the fully open condition of the variable nozzle device. In this condition, the sliding piston device and, as shown in FIG. 10B and FIG. 10C, the nozzle ring are fully open.

Figure 11A:
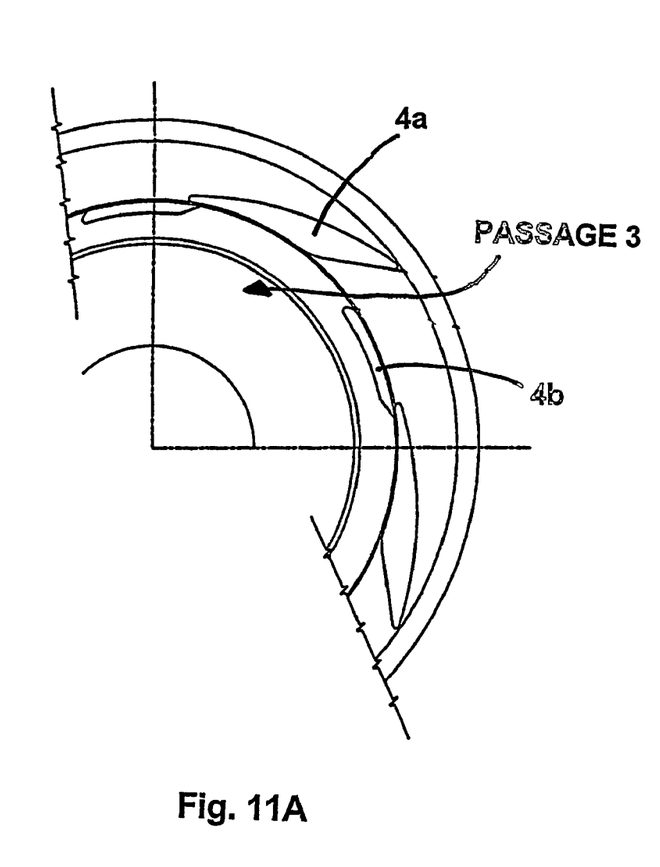
FIG. 11A shows a portion of the nozzle ring in a closed position.
Figure 11B:
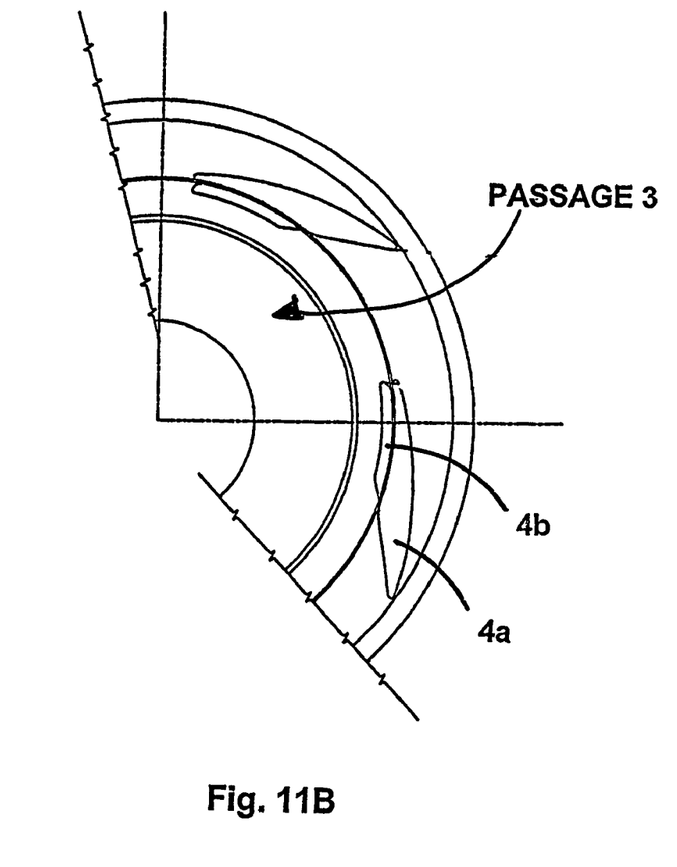
FIG. 11B shows a portion of the nozzle ring in an open position.

FIG. 11A and FIG. 11B are partial views of the nozzle ring according to the embodiment of the present invention. The nozzle ring in FIG. 11A is in the fully closed position, thereby generating a passage 3 between the fixed vanes 4a and the movable vanes 4b. The nozzle ring shown in FIG. 11B is in the fully open position, and the passage 3 between the fixed vanes 4a and the movable vanes 4b is accordingly widened in comparison with the passage 3 shown in FIG. 11A.

The cooperation between the variable vane means and the sliding piston device is explained with reference to FIG. 1-FIG. 3. As shown in FIG. 1, the sliding piston device is provided adjacent in the axial direction of the piston 5 such that the piston 5 slidably abuts against its axial end face with the axial end faces of the movable vanes 4b. A protrusion 11 is provided at said abutting face of the piston 5 which is provided with an inclined portion 12. The inclined portion 12 is capable to be brought into engagement with an end face of the movable vane 4b by rotating the movable vane support plate 7 to the opening direction of the variable vane means.

The piston 5 is slidably supported in the exhaust gas turbine housing 2 so as to be movable in the axial direction with respect to the variable vane means.

When the actuating mechanism 10 is operated starting from the fully closed position of the variable vane means, the movable vane 4b is moved slidably along the end face of the piston. Thereby, the variable vane means is gradually opened and the piston substantially keeps its axial position.

When the actuating mechanism 10 is further operated against the force of the spring member 19, the inclined portion 12 of the protrusion 11 comes into engagement with the end face of the movable vane 4b. This condition is shown in FIG. 2. That is, the variable vane means is in a mid-open position.

When the actuating mechanism is further operated, the end face of the movable vane 4b presses the inclined portion 12 of the protrusion 11 and thereby gradually moves the piston 5 axially away from the variable vane means as the actuating mechanism 10 is further operated.

Thereby, the space for passing through the exhaust gas into the turbine is further increased.

According to the present invention, only one single actuating mechanism is required to operate two different members for adjusting the characteristics of the exhaust gas flow passage of the turbocharger apparatus.

In the present invention, the movable vanes 4b are formed so as to protrude beyond the fixed vanes 4a. Therefore, the geometric characteristic of the exhaust gas inlet can be further improved in the condition that the piston is axially moved away from the variable vane means. That is, there is no gap in the flow passage which is not provided with a vane even if the piston is moved as far away as possible from the variable vane means. Thereby, the undirected flow of the exhaust gas can be avoided irrespective of the adjusting condition of the variable vane means or the sliding piston member. That is, the axially displaceable member 5 is continuously in contact with at least a portion of the vane assembly. In the shown embodiment, the contact portion is formed as the protrusion 11.

Although the invention is explained in detail with reference to the particular embodiment, the invention is not limited to the structures of the embodiment. In particular, the fixed vanes and/or the movable vanes can both be movable and displaceable relative to each other. Furthermore, the invention is not limited to the structure applying the movable vane plate and the fixed vane plate. Any structure can be applied which enables portions of the vanes to be movable relative to each other. The engagement of the axially displaceable member with the portion of the vanes is not limited to the protrusion and/or the inclined surface portion. Any engagement can be applied as long as the vanes cooperate with the axially displaceable member. Finally, it is to be noted that the variable vane means and the axially displaceable member can be applied separately or in combination with each other.

The invention claimed is:

1. A variable nozzle device for a turbocharger comprising an annular arrangement of vanes disposed in a nozzle formed between an inner wall and an outer wall, said outer wall being constituted by an axially displaceable member, wherein said axially displaceable member is provided with a surface configured to react against said inner wall to drive the axially displaceable member in axial displacement.

2. A variable nozzle device according to claim 1, wherein said surface is configured to react against an actuator member on said inner wall.

3. A variable nozzle device according to claim 2, wherein said surface is configured to drive the axially displaceable member in axial displacement in response to a rotational movement of said actuator member.

4. A variable nozzle device according to claim 3, wherein said annular arrangement of vanes is provided on said inner wall.

5. A variable nozzle device for a turbocharger comprising:
an annular arrangement of vanes disposed in a nozzle formed between an inner wall and an outer wall, said outer wall being constituted by an axially displaceable member;
wherein said axially displaceable member is displaceable by a force reacted against the side of said inner wall;
wherein said force is exerted by an engagement of said axially displaceable member with an actuator member on said inner wall;
wherein said axially displaceable member is displaceable by a rotational movement of said actuator member;
wherein said annular arrangement of vanes is provided on said inner wall; and
wherein said vanes each comprise at least two portions which are movable relative to each other.

6. A variable nozzle device according to claim 5, wherein said at least two portions which are movable relative to each other comprise at least one fixed vane member and one movable vane member.

7. A variable nozzle device according to claim 6, wherein said movable vane member constitutes said actuator member.

8. A variable nozzle device according to claim 7, wherein said axially displaceable member defines a protrusion provided with an inclined portion configured to engage said movable vane member to displace said axially displaceable member.

9. A variable nozzle device according to claim 8, wherein said fixed vane member and said movable vane member protrude from a fixed vane plate and a movable vane plate, respectively, wherein the fixed vane plate and movable vane plate are rotatable relative to each other and form a nozzle ring.

10. A variable nozzle device according to claim 9, wherein said axially displaceable member is displaced by said movement of said movable vane member when said movable vane member is in a predetermined position range.

11. A variable nozzle device according to claim 10, wherein said axially displaceable member is moved by said movable vane member to open an annular inflow passageway as said movable vane members are moved to open nozzle passages formed between said vanes.

12. A variable nozzle device according to claim 6, wherein said fixed vane member and said movable vane member protrude from a fixed vane plate and a movable vane plate, respectively, wherein the fixed vane plate and movable vane plate are rotatable relative to each other and form a nozzle ring.

13. A variable nozzle device according to claim 12, wherein said axially displaceable member is displaced by said movement of said movable vane member when said movable vane member is in a predetermined position range.

14. A variable nozzle device according to claim 13, wherein said axially displaceable member is moved by said movable vane member to open an annular inflow passageway as said movable vane members are moved to open nozzle passages formed between said vanes.

15. A method for controlling a variable nozzle device of a turbocharger comprising a plurality of vanes arranged in a nozzle defined between an inner wall and an outer wall, said vanes forming nozzle passages, said method comprising the steps of: adjusting the nozzle passages by adjusting the configuration of said vanes, and adjusting the nozzle by varying the interval between said inner wall and said outer wall, wherein the adjusting of said nozzle is actuated by said vanes.

16. A method according to claim 15, wherein said interval between said inner wall and said outer wall is gradually increased as said nozzle passages open.

17. A method according to claim 16, wherein said interval between said inner wall and said outer wall is varied by the adjusting of said nozzle passages when said nozzle passages are in a predetermined opening range.

18. A method according to claim 15, wherein the adjusting of said nozzle is achieved by a single actuating mechanism.

19. A method according to claim 15, wherein said interval between said inner wall and said outer wall is varied by the adjusting of said nozzle passages when said nozzle passages are in a predetermined opening range.

20. A variable nozzle device for a turbocharger comprising an annular arrangement of vanes disposed in a nozzle formed between an inner wall and an outer wall, said outer wall being constituted by an axially displaceable member, wherein:

said axially displaceable member is displaceable by an action exerted from the side of said inner wall;

said action is exerted by an engagement of said axially displaceable member with an actuator member on said inner wall;

said axially displaceable member is displaceable by a rotational movement of said actuator member;

said annular arrangement of vanes is provided on said inner wall; and said vanes each comprise at least two portions which are movable relative to each other.

21. A variable nozzle device according to claim 20, wherein said at least two portions which are movable relative to each other comprise at least one fixed vane member and one movable vane member.

22. A variable nozzle device according to claim 21, wherein said movable vane member constitutes said actuator member.

23. A variable nozzle device according to claim 21, wherein said fixed vane member and said movable vane member protrude from a fixed vane plate and a movable vane plate, respectively, wherein the fixed vane plate and movable vane plate are rotatable relative to each other and form a nozzle ring.

24. A variable nozzle device according to claim 23, wherein said axially displaceable member is displaced by said movement of said movable vane member when said movable vane member is in a predetermined position range.

25. A variable nozzle device according to claim 24, wherein said axially displaceable member is moved by said movable vane member to open an annular inflow passageway as said movable vane members are moved to open nozzle passages formed between said vanes.

26. A variable nozzle device according to claim 21, wherein said at least two vane portions are movable relative to each other in a circumferential direction, and wherein one of said at least two portions forms an adjustable extension of said vane in the circumferential direction of said annular arrangement.

27. A variable nozzle device according to claim 26, wherein said fixed vane member and said movable vane member protrude from a fixed vane plate and a movable vane plate, respectively, said plates being rotatable relative to each other.

28. A variable nozzle device according to claim 27, wherein an opening amount of said nozzle device is gradually adjustable by rotating said movable vane plate relative to said fixed vane plate.

29. A variable nozzle device according to claim 28, wherein said movable vane plate is rotatable by an actuator mechanism.

30. A variable nozzle device according to claim 27, wherein said movable vane plate is rotatable by an actuator mechanism.

31. A variable nozzle device according to claim 30, wherein said movement of said vane members is restricted by a restriction means.

32. A variable nozzle device for a turbocharger, comprising an annular arrangement of vanes, each vane comprising at least two portions movable relative to each other in a circumferential direction, wherein:

one of said at least two portions forms an adjustable extension of said vane in the circumferential direction of said annular arrangement;

said at least two portions comprise a fixed vane member and a movable vane member;

said fixed vane member and said movable vane member protrude from a fixed vane plate and a movable vane plate, respectively, said plates being rotatable relative to each other;

an opening amount of said nozzle device is gradually adjustable by rotating said movable vane plate relative to said fixed vane plate;

said movable vane plate is rotatable by an actuator mechanism; and said movable vane member is urged toward a closing direction of said nozzle device relative to said fixed vane member by a spring member.

* * * * *